(12) United States Patent
Giltaca et al.

(10) Patent No.: US 9,544,975 B2
(45) Date of Patent: Jan. 10, 2017

(54) LIGHTING CONTROL SWITCH APPARATUS AND SYSTEM

(75) Inventors: Rod M. Giltaca, Vancouver (CA); Omar Tabba, Montreal (CA); R. Kyle Smith, Dallas, TX (US); Pablo Cassani, Montreal (CA)

(73) Assignee: YWIRE TECHNOLOGIES INC., Montreal (CA)

( * ) Notice: Subject to any disclaimer, the term of this patent is extended or adjusted under 35 U.S.C. 154(b) by 752 days.

(21) Appl. No.: 12/979,291

(22) Filed: Dec. 27, 2010

(65) Prior Publication Data
US 2011/0187275 A1 Aug. 4, 2011

Related U.S. Application Data

(60) Provisional application No. 61/301,360, filed on Feb. 4, 2010, provisional application No. 61/329,727, filed on Apr. 30, 2010.

(51) Int. Cl.
*H05B 37/02* (2006.01)
(52) U.S. Cl.
CPC ...... *H05B 37/0227* (2013.01); *H05B 37/0218* (2013.01); *H05B 37/0254* (2013.01); *H05B 37/0263* (2013.01); *Y02B 20/46* (2013.01)
(58) Field of Classification Search
USPC ................. 340/9.1, 12.32; 362/95
See application file for complete search history.

(56) References Cited

U.S. PATENT DOCUMENTS

| | | | |
|---|---|---|---|
| 4,527,198 A | 7/1985 | Callahan | |
| 4,697,227 A | 9/1987 | Callahan | |
| 4,797,795 A | 1/1989 | Callahan | |
| 4,894,760 A | 1/1990 | Callahan | |
| 4,947,302 A | 8/1990 | Callahan | |
| 4,982,176 A * | 1/1991 | Schwarz | F21S 9/032 136/291 |
| 5,175,677 A * | 12/1992 | Kushiro | H02J 3/14 340/3.51 |
| 5,471,119 A * | 11/1995 | Ranganath | H05B 37/02 315/294 |
| 5,699,243 A * | 12/1997 | Eckel | H05B 37/0227 315/159 |

(Continued)

FOREIGN PATENT DOCUMENTS

| | | |
|---|---|---|
| CA | 2722785 A1 | 11/2009 |
| WO | 03102890 A2 | 12/2003 |

OTHER PUBLICATIONS

International Search Report for PCT/CA2010/002028, May 11, 2011, 4 pages, ISA.

(Continued)

*Primary Examiner* — Fekadeselassie Girma
(74) *Attorney, Agent, or Firm* — Hugh Mansfield

(57) ABSTRACT

An improved hardware light switch and a system comprising at least one of the light switches and control/monitoring means is disclosed. The improved light switch and system provide a more flexible, convenient and economical means to reduce energy consumption both at the switch and remotely. In a first configuration, the improved light switch comprises an electronic switch, a broadband powerline communication (PLC) transceiver that includes processing ability, a unique MAC address and a TCP/IP stack.

21 Claims, 12 Drawing Sheets

(56) References Cited

U.S. PATENT DOCUMENTS

| | | | |
|---|---|---|---|
| 5,905,442 A * | 5/1999 | Mosebrook | G05B 19/0423 307/31 |
| 5,949,200 A | 9/1999 | Ference et al. | |
| 5,956,487 A * | 9/1999 | Venkatraman | H04L 12/2803 340/3.1 |
| 5,982,103 A | 11/1999 | Mosebrook et al. | |
| 6,155,160 A * | 12/2000 | Hochbrueckner | G05D 23/1917 126/112 |
| 6,441,723 B1 | 8/2002 | Mansfield, Jr. et al. | |
| 6,633,472 B2 * | 10/2003 | Lai | 361/93.1 |
| 6,805,469 B1 | 10/2004 | Barton | |
| 6,822,555 B2 | 11/2004 | Mansfield, Jr. et al. | |
| 6,867,558 B2 | 3/2005 | Gaus et al. | |
| 6,888,323 B1 | 5/2005 | Null et al. | |
| 6,912,429 B1 * | 6/2005 | Bilger | G08B 25/008 236/49.3 |
| 6,934,862 B2 * | 8/2005 | Sharood | G06Q 30/0235 713/300 |
| 6,963,178 B1 * | 11/2005 | Lev | H05B 37/0263 315/209 R |
| 6,993,417 B2 | 1/2006 | Osann, Jr. | |
| 7,034,663 B2 | 4/2006 | Mansfield et al. | |
| 7,118,235 B2 | 10/2006 | Barton | |
| 7,122,976 B1 | 10/2006 | Null et al. | |
| 7,339,466 B2 | 3/2008 | Mansfield et al. | |
| 7,345,998 B2 | 3/2008 | Cregg et al. | |
| 7,405,524 B2 | 7/2008 | Null et al. | |
| 7,436,132 B1 | 10/2008 | Null | |
| 7,761,186 B2 * | 7/2010 | Keller | G05B 15/02 160/5 |
| 7,948,189 B2 * | 5/2011 | Ahmed | H05B 37/0218 315/291 |
| 7,994,928 B2 * | 8/2011 | Richmond | G08B 17/10 340/541 |
| 2001/0025349 A1 * | 9/2001 | Sharood et al. | 713/340 |
| 2003/0009265 A1 * | 1/2003 | Edwin | G06Q 10/06 700/295 |
| 2004/0036594 A1 * | 2/2004 | Ladow | B60Q 1/2611 340/468 |
| 2004/0227472 A1 * | 11/2004 | Gaus, Jr. | H05B 37/0263 315/314 |
| 2006/0119368 A1 * | 6/2006 | Sela | G01R 19/2513 324/522 |
| 2006/0125624 A1 * | 6/2006 | Ostrovsky | H05B 37/0227 340/527 |
| 2006/0262462 A1 * | 11/2006 | Barton | 361/1 |
| 2006/0284728 A1 * | 12/2006 | Rubinstein | H02J 13/0051 375/257 |
| 2007/0086514 A1 * | 4/2007 | Lawrence | H04B 3/54 375/219 |
| 2007/0091925 A1 * | 4/2007 | Miyazaki | H04B 3/542 370/469 |
| 2007/0160081 A1 | 7/2007 | Logvinov et al. | |
| 2008/0015740 A1 * | 1/2008 | Osann | G05B 15/02 700/276 |
| 2008/0074059 A1 * | 3/2008 | Ahmed | H05B 37/0218 315/291 |
| 2008/0179968 A1 | 7/2008 | Szabados et al. | |
| 2008/0211663 A1 * | 9/2008 | Mansfield | G08B 25/06 340/538 |
| 2008/0297359 A1 | 12/2008 | Cox et al. | |
| 2008/0316012 A1 | 12/2008 | Paasche et al. | |
| 2009/0009192 A1 * | 1/2009 | Farrelly | G01N 27/24 324/663 |
| 2009/0028372 A1 | 1/2009 | Cerasuolo | |
| 2009/0065595 A1 | 3/2009 | Kates | |
| 2009/0072766 A1 * | 3/2009 | Null | H05B 37/0218 315/361 |
| 2009/0149973 A1 * | 6/2009 | Keller | G05B 15/02 700/90 |
| 2010/0013608 A1 * | 1/2010 | Petrisor | G01S 19/14 340/12.32 |
| 2010/0014277 A1 * | 1/2010 | Delany | H01H 9/182 362/95 |
| 2010/0130142 A1 * | 5/2010 | Schubert | H01R 13/66 455/90.3 |
| 2010/0191388 A1 * | 7/2010 | Huizenga | H01H 47/24 700/296 |
| 2010/0207532 A1 * | 8/2010 | Mans | H05B 41/36 315/158 |
| 2010/0280677 A1 * | 11/2010 | Budike, Jr. | H05B 37/0272 700/296 |
| 2011/0032085 A1 * | 2/2011 | Maros | H05B 41/295 340/12.32 |
| 2011/0182012 A1 * | 7/2011 | Hilton | H02G 3/14 361/679.01 |
| 2011/0215735 A1 * | 9/2011 | Herbst | H04L 41/0803 315/297 |
| 2011/0215736 A1 * | 9/2011 | Horbst | G05B 19/418 315/297 |
| 2012/0008307 A1 * | 1/2012 | Delany | H01H 9/182 362/95 |
| 2012/0212332 A1 * | 8/2012 | Schubert | H01R 13/66 340/12.32 |
| 2012/0319477 A1 * | 12/2012 | Brownlee | H02J 9/065 307/23 |
| 2013/0013091 A1 * | 1/2013 | Cavalcanti | H05B 37/0272 700/90 |
| 2013/0185006 A1 * | 7/2013 | Schwager | G01R 27/28 702/58 |
| 2013/0320776 A1 * | 12/2013 | Cook | H02J 13/002 307/126 |

OTHER PUBLICATIONS

Written Opinion for PCT/CA2010/002028, May 11, 2011, 6 pages, ISA.
Mini Remote Control Center, Owner's Manual, Cat. No. 61-2677C, Tandy Corporation, 1999.
PIC-GSM development board, Users Manual, Olimex Ltd., 2008.
Powerhouse Motion Detector Model PR511, Owner's Manual, X-10, 1991.
Supplementary European Search Report and European Search Opinion for EP 10 84 4972, Jun. 16, 2014, 9 pages.
English translation of Abstract of CL 942-1996.
English translation of Abstract of CL 1398-2008.
English translation of Abstract of CL 2302-2008.
English translation of Abstract of CL 3059-2005.
XP 008164767 A1 (Mini Remote).
XP 008164768 A1 (PIC-GSM).
XP 008165604 A1 (Motion Monitor).
Second Office Action issued in corresponding Chilean application No. CL 2074-2012.

\* cited by examiner

LIGHTING CONTROL SWITCH APPARATUS AND SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Conservation has been the topic of national energy campaigns, and one approach to saving energy is to turn off lighting when not in use. This can be accomplished most effectively through automated lighting control that does not rely on human intervention. Net worked lighting control has existed in some form for more than 20 years. However, current lighting control solutions require additional wiring installations in order to relocate electric switching to a central panel. The alteration of an electrical infrastructure creates an installed cost burden, and reduces or prevents an acceptable payback scenario for the majority of end-users. Current solutions offer large variations in lighting control functionality, ranging from low cost, unreliable, standalone motion sensors, to high-end, addressable and networked systems. Such high-end systems require a substantial financial investment, and also a commitment to the inconveniences of the retrofit installation process. There is a need for a cost-effective lighting control system that offers high-end functionality at a significantly lower cost.

SUMMARY OF THE INVENTION

In one aspect, the present invention provides an apparatus that combines the functionality of a light switch and powerline communication technology, such as Broadband Powerline (BPL). In another aspect, the invention provides for a fully addressable and reliable communication network, required for comprehensive lighting control, while eliminating the need for any circuit relocation or ballast replacement. Advantageously, a building's existing power delivery infrastructure can double as a high-speed data network. Aside from any improvements in lighting control, this can lead to installation cost reductions of over 80% as compared to existing high-end lighting control systems. In yet another aspect, the present invention provides the ability to integrate with the emerging SmartGrid.

Recent advances in BPL technology have allowed its reliable use on commercial and industrial power grids, which are notoriously noisy. Standards in BPL have evolved, and the Universal Powerline Alliance (UPA) has set specifications that allow for signal repetition, IP communication, and dynamic frequency hopping as standard features on UPA-compliant transceivers. In one aspect, the present invention is implemented using UPA-compliant transceivers.

DETAILED DESCRIPTION OF THE INVENTION

Figure 1:
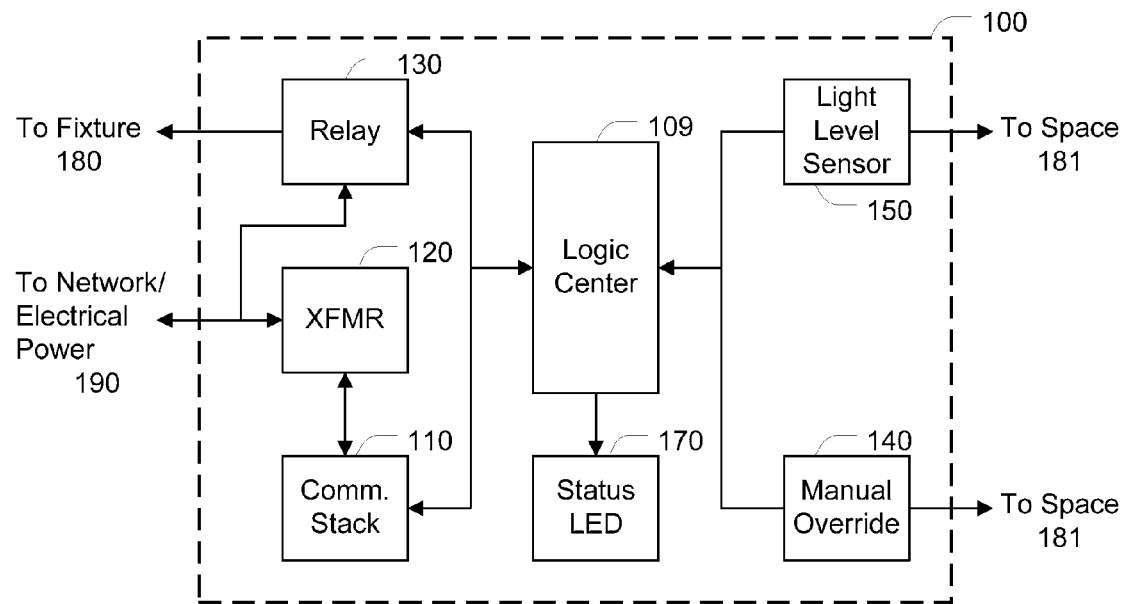
FIG. 1 is an exemplary block diagram illustrating a lighting controller, in accordance with one embodiment of the invention.

The following description is presented to enable any person skilled in the art to make and use the invention, and is provided in the context of particular applications of the invention. Various modifications to the disclosed embodiments will be readily apparent to those skilled in the art, and the general principles defined herein may be applied to other embodiments and applications without departing from the scope of the present invention. Reference to various embodiments and examples does not limit the scope of the invention, which is limited only by the scope of the claims attached hereto. Additionally, any examples set forth in this specification are not intended to be limiting and merely set forth some of the many possible embodiments for the claimed invention.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It is also understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The invention relates to apparatus for lighting facilities or buildings. The invention also relates to a system for lighting facilities or buildings. The invention further relates to a method for producing the apparatus. The invention further relates to a method of lighting a facility or building. The invention further relates to a method of controlling and/or monitoring lighting apparatus in a facility. The invention further relates to a computer readable storage medium storing instructions that, when executed on one or more computers, causes the computers to perform a method of controlling and/or monitoring lighting apparatus in a facility.

Accordingly, in one aspect, the present invention provides an addressable light controller comprising: at least one relay; a powerline communication module; and a processor. The addressable light controller may further comprise a manual override. The manual override may be actuated by a user in a space. The controller may further comprise an embedded web page that displays data that regulate the functioning of the controller. The embedded web page may allow said data to be changed by a user. The controller may further comprise at least one voltage input. The addressable light controller may further comprise at least one sensory element. The at least one sensory element may be selected from the group consisting of: a passive infrared sensor, and a light level sensor. The at least one sensory element may be installed at a location apart from the controller, and may be in a logical relationship with said controller. The at least one sensory element may further include at least one potentiometer for manual adjustment of said at least one sensory element.

In another aspect, the present invention provides a system for lighting a space comprising: at least one addressable light controller connected to a powerline network; at least one light fixture; wherein said at least one light fixture is coupled to the at least one addressable light controller; and wherein said at least one addressable light controller is configured to replace an existing standard light switch without installation of additional wiring. The system may further comprise a front end, at least one Ethernet-to-powerline router, at least one web server, at least one combination Ethernet-to-powerline router/web server, or at least one ballast and wherein said ballast is connected to the at least one addressable light controller.

In yet another aspect, the present invention provides a method of controlling lighting in a space, wherein the method comprises: detecting motion in a space; checking the status of a relay in an addressable light controller; initiating a time delay countdown when the relay is energized; de-energizing the relay upon expiry of the time delay; checking a light level sensor for an ambient light level; comparing said ambient light level to a user-defined setpoint; and energizing the relay when the ambient light level is below the user-defined setpoint. The method may further comprise: sending an operation status to an authority when the time delay countdown is initiated.

In yet a further aspect, the present invention provides a method of controlling lighting in a space, wherein the method comprises: detecting motion in a space; checking the status of an analog output coupled to a dimmable ballast; initiating a time delay countdown when the analog output is energized; ramping down to zero the analog output upon expiry of the time delay; checking a light level sensor for an ambient light level; comparing said ambient light level to a user-defined setpoint; holding the analog output at a set value for a set time duration; checking for expiry of the time delay countdown; and ramping up the analog output when the ambient light level is below the user-defined setpoint, until the ambient light level matches the user-defined setpoint. The method may further comprise: actuating a manual override; re-checking the status of the analog output; re-checking the light level sensor for the ambient light level when the analog output is not energized; and ramping down to zero the analog output when the analog output is energized.

In another aspect, the present invention provides a computer readable storage medium storing instructions that, when executed on one or more computers, causes the computers to perform the methods of controlling lighting in a space set out above.

Advantageously, the present invention eliminates installation of additional wiring, and utilizes a building's existing power delivery infrastructure. For example, the invention provides for addressability and control of existing lighting ballasts, without requiring their replacement. The invention provides for wiring configurations generally found in commercial and residential spaces, including: 3-wire power to the switch; 3-wire power to the fixture, 2-wire to the switch; 3 and 4-way switching; and dimming applications.

Figure 18:
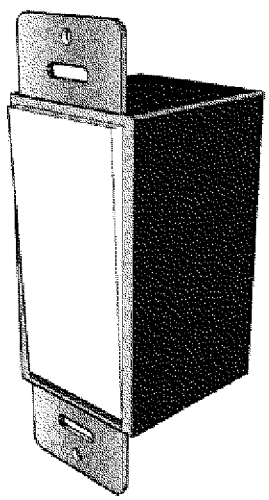
FIG. 18 is an exemplary graphical representation of a light switch apparatus, in accordance with one embodiment of the invention.

Referring to FIG. 18, in one embodiment of the invention, a lighting control switch apparatus (hereinafter referred to as "lighting controller" or "controller") is provided in the approximate dimensions of a standard single gang light switch, and contains standard elements that electricians expect to find in a light switch, such as standard mounting brackets for fastening the device to the junction box.

Figure 11:
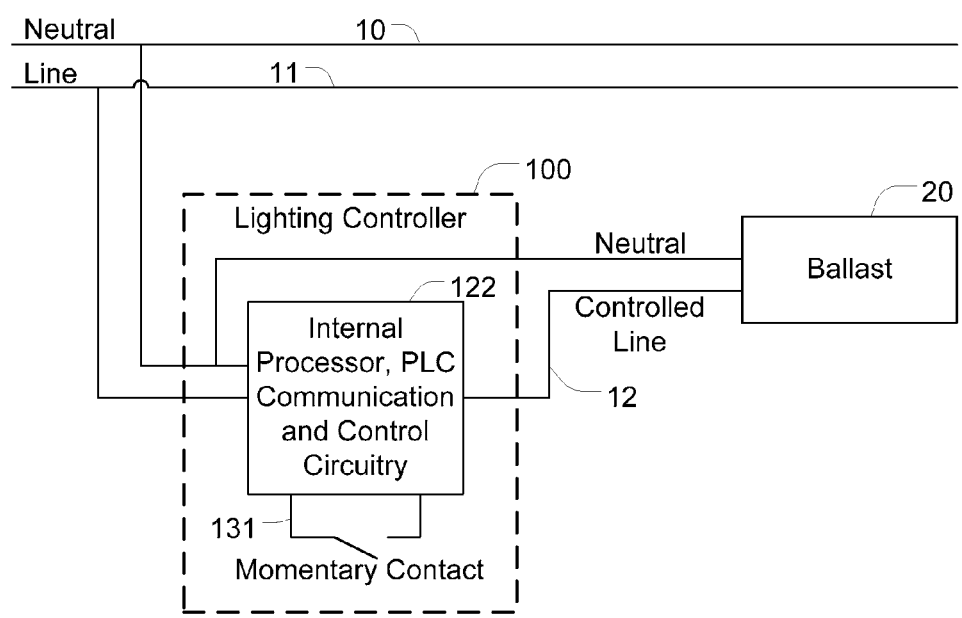
FIG. 11 is an exemplary block diagram illustrating installation and wiring for a lighting controller, in accordance with one embodiment of the invention.

Installation involves replacing an existing light switch with the controller of the present invention. Referring to FIG. 11, the method of wiring is the same 3-wire installation standard to all light switches that comply with the National Electric Code (NFPA 70), herein incorporated by reference (ground wiring in figures is implied). While adhering to standard safety measures, the existing faceplate and switch are removed from the junction box. Next, the controller may provide three (3) - 6" color-coded, external leads that are attached to the existing wires in the junction box using standard twist-on wire connectors, or other method in keeping with industry best practices. Once properly wired, the controller is secured to the junction box in the same manner as the original switch, and a standard decora-style faceplate is mounted onto the device.

Accordingly, physical installation by a qualified electrician does not require special training, and requires a minimum amount of time to complete (approximately 8 minutes). As such, the form factor contributes to a lower installation cost.

Figure 2:
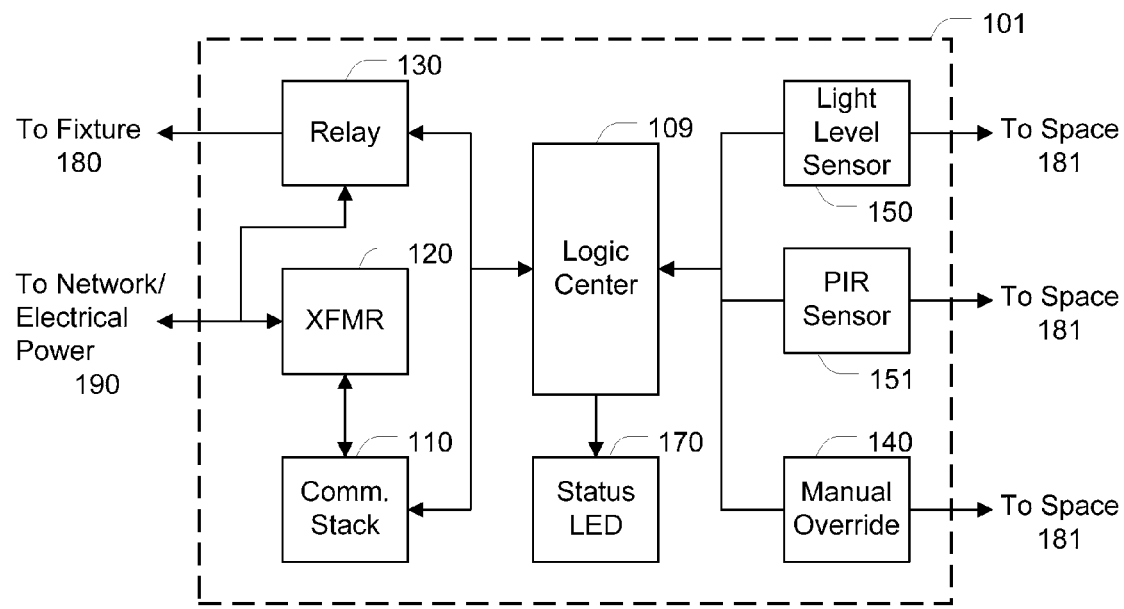
FIG. 2 is an exemplary block diagram illustrating a lighting controller comprising a motion detector, in accordance with one embodiment of the invention.

The embodiments shown in FIG. 1 and FIG. 2 detail the logic associated with sensory elements that the controller may comprise.

The lighting controller comprises two areas of functionality: communications and manual override (e.g., by way of a manual pushbutton). The controller may comprise additional areas of functionality, such as sensory. The sensory elements of the controller may involve several types of space sensing, such as available lux level, and passive infrared ("PIR") sensing. Referring to FIG. 1, in one embodiment, the controller 100 may contain a light level sensor 150 with an adjustable set point configured either manually or in software. Manual adjustment may be provided by one or more potentiometers located proximate to, such as behind, the manual override or manual pushbutton 140. The function of the light level sensor 150 is to determine the available light in the space 181, and based on that condition allow for fixtures 180 on that circuit to be energized. Transformer (XFMR) 120 powers the controller, which is preferably a step-down transformer to convert 120 V AC to 5V DC for internal electronics. In other embodiments, the XFMR 120 component may also refer to a switching power supply that works for 110/120 V AC to 220/240/277 V AC, or optionally for 220/240/277 V AC and 347 V AC, and may comprise additional circuit(s) for signal injection. Accordingly, in the figures, component XFMR 120 may also represent power supply and signal injection, but for simplicity and brevity, the figures only refer to XFMR 120.

As will be understood by a person skilled in the art, variants of the lighting controller are desirable for different lighting configurations. Referring to FIG. 2, controller 101 is one example of such a variant, which may additionally include a PIR sensor 151 that receives an array of infrared emissions through a single Fresnel lens, and detects movement by objects with a human heat signature. A voltage is induced in the sensor if a heat signature of a certain difference with respect to the ambient passes in the space 181 from one infrared field to another. Upon that induction, a relay 130, such as a mechanical relay or an electronic solid state relay, in the off position reverses state and energizes the fixtures 180 on that circuit. The PIR sensor 151 voltage may be digitalized internally, and treated as a digital stream instead of an analog voltage.

At the same time, a time delay may be initiated in the controller 101, at the logic center 109. At the end of the time delay, if there is no more motion sensed in the space 181, the relay 130 will de-energize and the lights will turn off. If the sensor 151 does register motion during the time-delay, that countdown will start again. The sensitivity of that sensor and the time delay for each controller 101 may be controlled either manually or in software. Manual adjustment may be provided by one or more potentiometers located proximate to, such as behind, the manual override 140. The sensing elements in the controller 101 efficiently eliminate wasteful lighting use, and enable automated response of the lighting system in reaction to changing environmental conditions.

Controllers 100, 101 may include an on-board BPL communication stack 110, which can act as a mini-webserver via the IP capabilities of a BPL transceiver. Controllers 100, 101 may provide an embedded web page to display the variables and constants that regulate the functioning of the controllers, such that a user may monitor and configure the controllers. This webpage can be accessed via the IP address of each controller.

Communication between the controllers 100, 101 and front-end webserver exists for at least two functional purposes. First, the switch may communicate status back to the front end upon any change of state at the space. Second, the switch receives and responds to any scheduled or override commands sent from the front end 200.

The controllers of the present invention are addressable, and may also communicate directly with each other. For example, a single controller may be used to control one or more other controllers.

A small control panel may be placed behind the main cover of the controllers. The control panel allows a qualified user to toggle the controllers in between stand-alone and networked modes. The control panel also allows for manual manipulation of other operating parameters, such as PIR sensitivity, timer delay setting, and light level set point.

Figure 19:
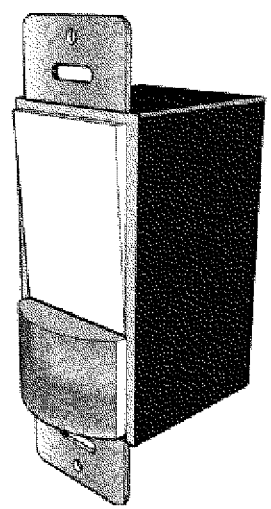
FIG. 19 is an exemplary graphical representation of a light switch apparatus comprising a motion detector, in accordance with one embodiment of the invention.

A manual override 140 of the controllers 100, 101 may reside directly on its exposed face, and may be in any shape that allows manual actuation. Preferably, the manual override will maintain an aesthetic consistent with a rocker switch or button in a standard decora-style light switch, as shown in FIG. 18 and FIG. 19. Once depressed by a user in the space 181, the manual override 140 will reverse the current state of the relay 130, turning the lights ON where they had been OFF, and OFF where they had been ON. The relay 130 itself may latch, such that in the event of a power outage, a fixture 180 which had been energized prior to the outage will, without any command or further interaction, again energize once power is restored.

In some control systems, manual commands rely on a polling and supervisory relationship with a master/central controller for authorization. The present invention does not require network communication to turn light(s) ON or OFF at the switch. The manual override 140 on the controllers 100, 101 may be electrically interlocked with the control relay 130. As long as the controller 100 or 101 is powered, the relay 130 will actuate upon actuation of the manual override 140. This allows the controllers 100, 101 to be installed and functional prior to any system software or network management functions being installed, configured and/or enabled. Advantageously, in terms of project management and practical implementation, the present invention creates a minimal downtime environment. Also, under any operating conditions, the occupant of a room may have complete control of the lighting environment independent from the control system. There is no logical- or network-based relationship necessary to turn lights or fixtures 180 on or off within the space 181, which is important for user experience and for safety.

Preferably, the controllers employ switches that use an actuator that always returns to a neutral position so as to compensate for any network override that may conflict with a polarity-sensitive switch.

In other embodiments, the controllers may contain a thin LED strip located along the manual override 140, most preferably along the bottom. The LED may be tri-color (red-blue-green) and may be manipulated through configuration properties in front end software to communicate information to the user.

Motion detection may be performed internally (using a motion detector), or a digital input (e.g. 24V) for an external motion detector, or using one input and one output to establish a communication with an external motion detector and light sensor. In one embodiment, the controllers may comprise additional sensors or detectors, such as a passive infra-red (PIR) motion detector. A PIR sensor 151 may be preferably located directly underneath the manual override switch or button, as shown in FIG. 19.

Controllers 100, 101 enable various modes of operation. For example, in a "manual on/automatic off" mode, the PIR sensor 151 can be configured to only de-energize the relay 130 at the end of the time delay. This allows the occupant of the room to determine if the ambient light in the room is sufficient for their purposes before the PIR sensor 151 causes the fixtures to be energized as a result of sensing occupancy. Another mode may include "manual on/manual off", which overrides the automatic functions of the controllers 100, 101, effectively disconnecting them from any network. The controller may further comprise a Network-Manual switch to enable or disable network communication. The controller may additionally comprise an auto, on, off switch that allows the controller to switch the lights automatically based on configuration, to force the lights on by energizing the relay 130, or to force the lights off by de-energizing the relay 130.

Figure 3:
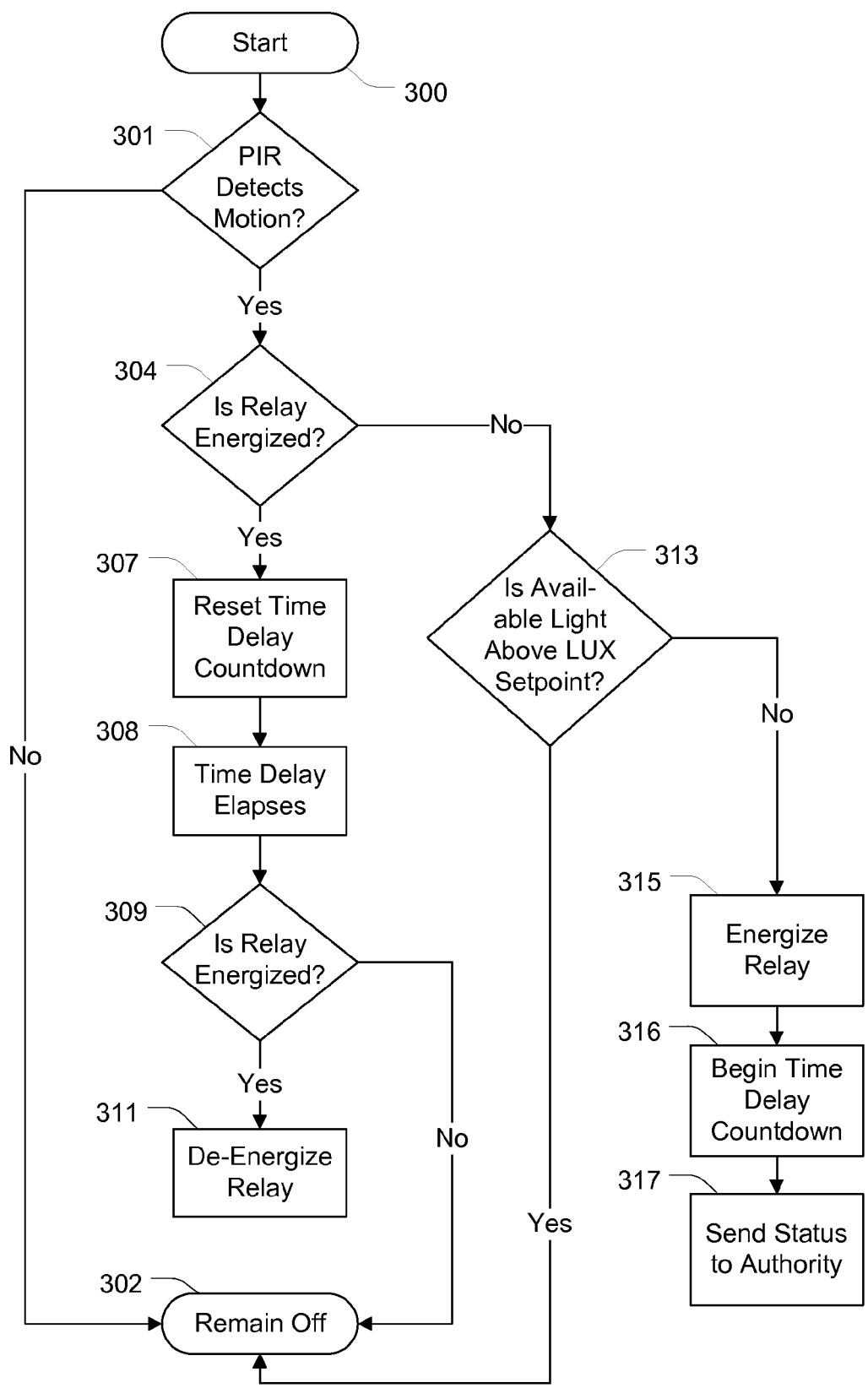
FIG. 3 is an exemplary block diagram illustrating the logical process and sequence of operations for a lighting controller with an embedded motion detector, in accordance with one embodiment of the invention.

Yet another mode may include an "automatic on/automatic off" via configuration properties in software, which provides fully automated fixture 180 control. Referring to FIG. 3, sensory logic for "automatic on/automatic off" control is shown for controller 101 that includes a PIR sensor 151. Initially (Step 300), absent the PIR sensor 151 detecting motion (Step 301), the relay 130 will not be energized and remain off (Step 302). When the PIR sensor 151 detects motion, the relay 130 is checked for whether it is energized (Step 304). If the relay 130 is already energized, a time delay countdown is reset (Step 307). Upon the elapse of the countdown delay (Step 308), the relay is checked again (Step 309) for whether it is energized, and if so, it is de-energized (Step 311). At Step 309, if the relay 130 is not energized, it will remain off (Step 302).

When the relay 130 is found not to be energized at Step 304, the light level sensor 150 is checked for whether available light is above a user-defined LUX setpoint (Step 313), and if so, the relay 130 will be allowed to remain off (Step 302). If available light is found to be below the user-defined lux setpoint at Step 313, the relay 130 is energized (Step 315), a time delay countdown is initiated (Step 316), and an operation status may be sent to an authority (Step 317). Steps 315, 316 and 317 may take place in any order or in parallel. The authority may be any front end as configured by an administrator.

In another embodiment, the controller may include additional relays on board. For example, a two-relay design allows for two levels of lighting in the room, whereby a first level will turn on every connected fixture, and a second level will only turn on a lesser number of the connected fixtures. Both circuits may be controlled using the same manual override button. For instance, a single push may energize the first circuit, a second push may energize the second circuit, and a third push may de-energize both.

All features necessary as a requirement of national and municipal codes of major markets, such as air gap switches, may also be incorporated in the controller.

Accordingly, the controller may control lighting fixture states based several conditions of the space in which it resides, including: occupancy, ambient light, reference of time schedule, and overall electrical consumption of a building.

Advantageously, the controller addresses several circuit configurations, including: single gang, power to switch; multi-gang, power to switch; master controller for sub-zoned lighting; and dual circuit switching. The controller may be constructed to operate in any voltage environments, such as in a range from 110 V to 277 V or 220 to 347V.

Figure 4:
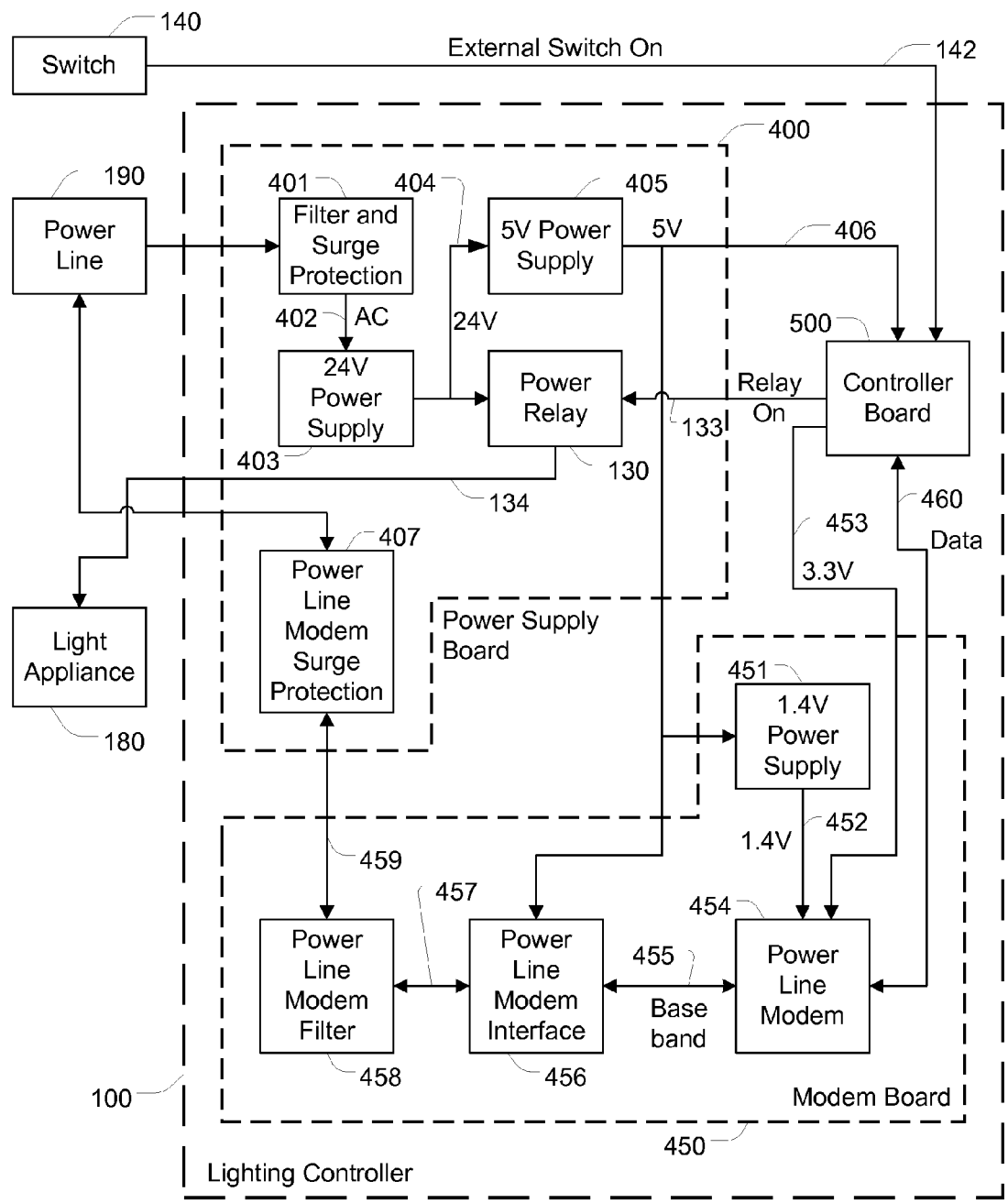
FIG. 4 is an exemplary block diagram illustrating a power supply component and a communication component of a lighting controller, in accordance with one embodiment of the invention.

Referring to FIG. 4, in one embodiment, the lighting controller may be constructed from three boards: (i) a power supply board 400 to power to the controller and interface with the power line 190, and where the high voltage sections are contained; (ii) a modem board 450 to enable communication between a local controller and a central system, using the power line as a transmission medium; and (iii) a controller board 500 to provide the logic functionality of the controller. Logic functionality may include, but is not limited to, mechanical interface with the user, time, light and motion sensibility adjustments, the On/Auto/Off, Manual/Auto and momentary switches, motion detection, and light sensing.

The manual override switch 140 located in the front plate toggles the power relay 130. The toggling and latching function is implemented either in hardware, using a dedicated circuit, or in software, using the software controller.

Depending on the mode, the motion detector may turn on the relay or turn it off when motion is not detected after a set time, which is set by the time adjustment located in the front plate, proximate the manual override switch 140. Motion sensibility can be changed using the sensibility adjustment located in the front plate, also proximate the momentary switch.

Automatic turn on may be blocked if the ambient lighting is higher than the value set by the light adjustment, located in the front plate, proximate the momentary switch. The manual override switch On/Auto/Off overrides the automatic functionality of the switch.

Communication with a central system is enabled using the power line. The relay status and the local adjustments can be monitored and overridden, but only if the switch is in Auto mode.

Referring to FIG. 4, the power supply board 400 includes filter and surge protection 401 to perform line voltage conditioning in order to avoid electromagnetic interference (EMI) generation and damage by high voltage discharges. A 24 V power supply 403 is provided to convert the conditioned line voltage 402, ranging from 85 to 305 V or 220 to 347 V AC to 24 V DC (404), with a typical 4 watt maximum output. A 5 V power supply 405 is provided to convert the direct current from 24 V DC to 5 V DC (406), with a typical 1 Amp maximum output current. A power relay 130 is provided and connected to the 24 V DC power supply 403 as well as to the controller board 500. The power relay 130 defaults to open, and is also connected to the light appliance 180, ballast, etc. The power relay 130 is preferably a 10 A, 277 V or 347 V AC relay. A modem surge protection 407 is connected to a modem filter 458 on the modem board 450, and protects a power line modem 454 from high voltage discharges.

The modem board 450 includes a 1.4V power supply 451 to convert from 5 V to 1.4 V (452), with a typical 2 Amp maximum output current, to power the power line modem 454. An integrated power line modem 454 is provided, which preferably includes RAM and flash storage memory.

A modem interface 456 is provided to integrate the signal conditioners for transmission and reception. The modem filter 458 is provided as a passive signal filter.

Figure 5:
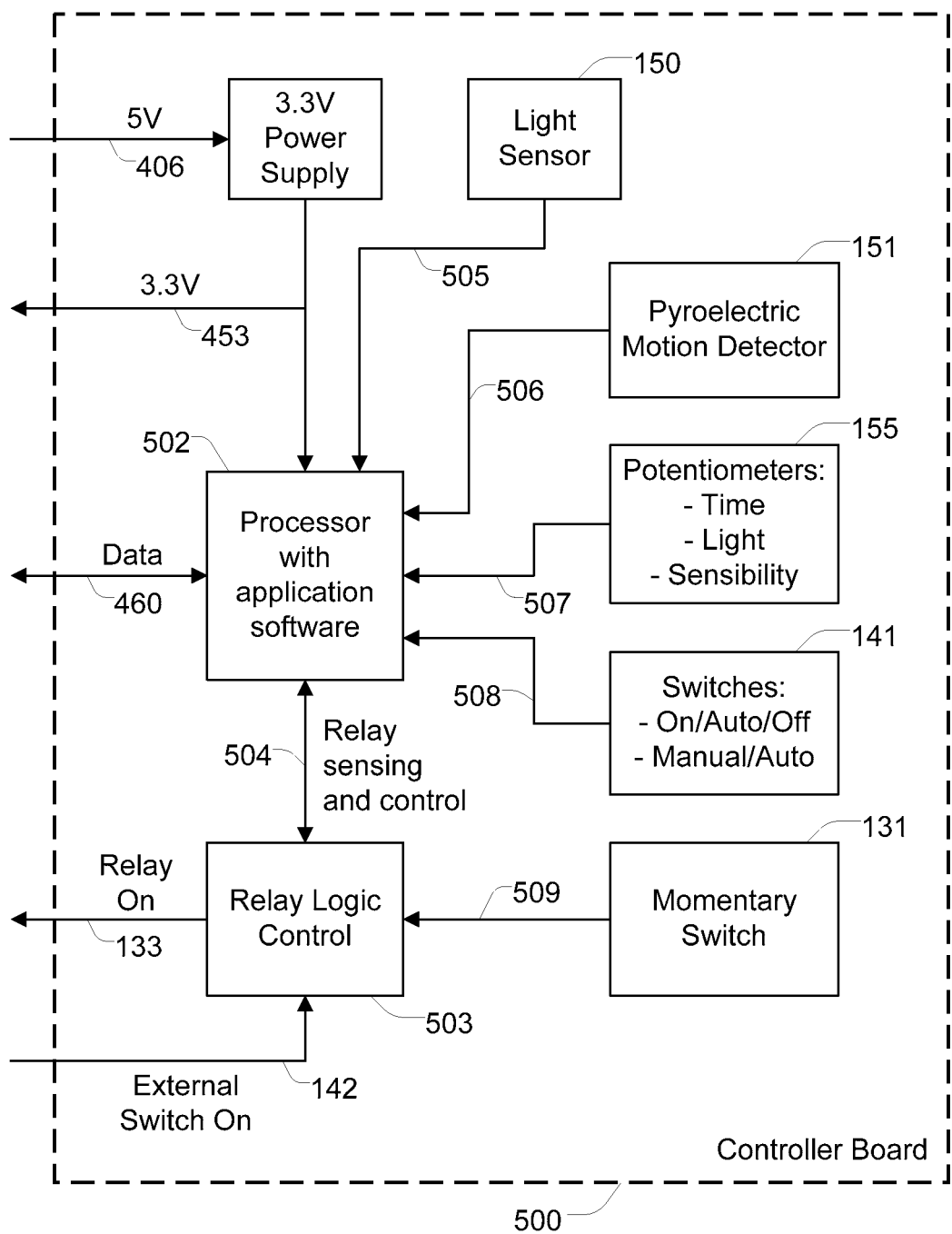
FIG. 5 is an exemplary block diagram illustrating a controller component of a lighting controller, in accordance with one embodiment of the invention.

Referring to FIG. 5, the controller board 500 includes a low-noise, 3.3 V power supply 501 to convert from 5 V to 3.3 V (453), with a typical 0.3 Amp maximum output current, to power a processor 502, and flash storage and RAM memories located in the Modem Board. The processor 502 is preferably integrated, and capable of running application software and performing all logic functions of the controller. The controller implements a communication protocol with a central system, using the power line modem 454 as a transparent bridge. A light sensor 150 is provided to measure the ambient lighting. Optionally, a pyroelectric or passive infra-red motion detector 151 may be provided, preferably in conjunction with a Fresnel lens, to detect the motion of a body with different temperature than the ambient temperature. The motion detector digitally transmits the amount of motion to the processor 502. Adjustable potentiometers 155 may be provided and connected to the processor 502 so that a user may set the desired value of time, light and sensibility. Switches 141 are provided and connected to the processor 502 to switch the functionality between Auto and forced On, Off or Manual. A relay logic control circuit 503 is provided to drive the power relay 130, interface with the processor 502, and perform an anti-bounce for a momentary switch 131 (which serves as the manual override 140), and any auxiliary functions. The momentary switch 131 is provided and connected to the relay logic control 503 so that the user can actuate the relay independently of the controller (i.e., turn On/Off the lights).

Figure 12:
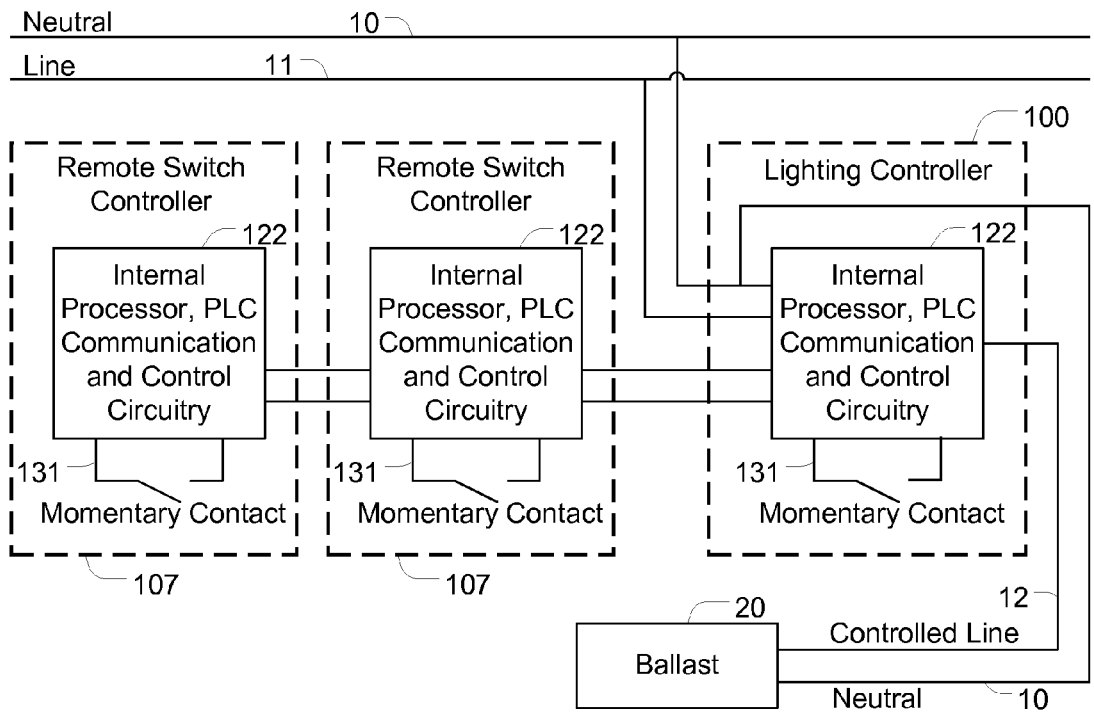
FIG. 12 is an exemplary block diagram illustrating installation and wiring for multiple controllers, in accordance with one embodiment of the invention.
Figure 13:
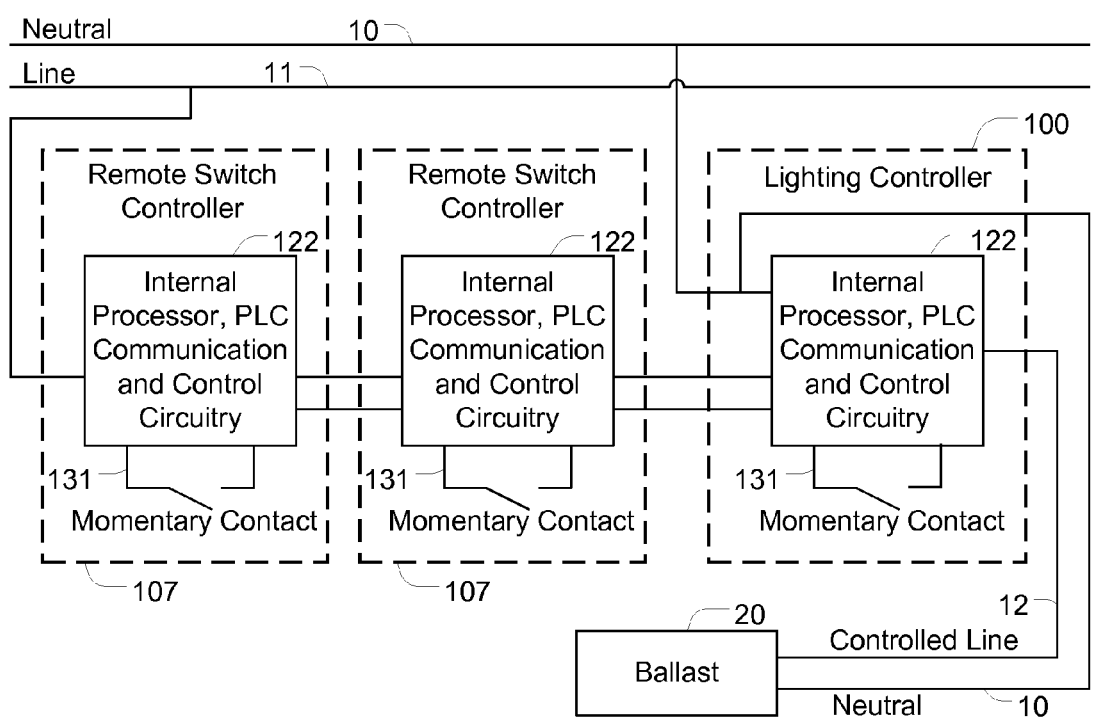
FIG. 13 is an exemplary block diagram illustrating installation and wiring for multiple controllers, in accordance with one embodiment of the invention.
Figure 14:
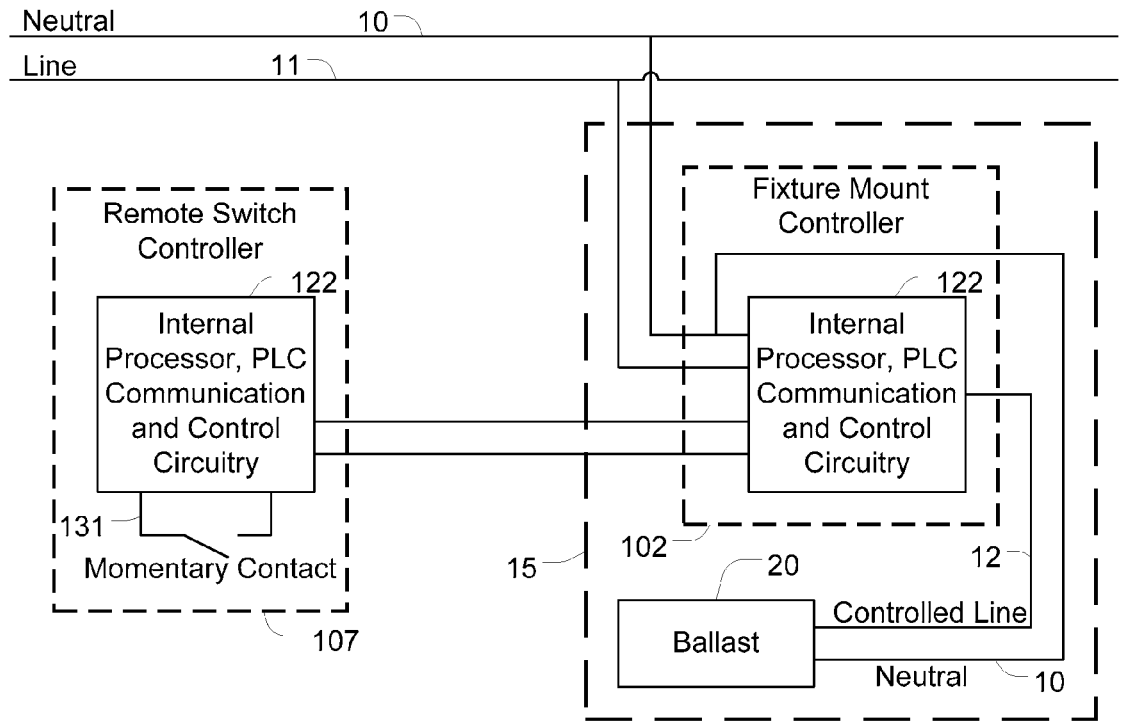
FIG. 14 is an exemplary block diagram illustrating installation and wiring for a remote switch controller and a fixture mount controller, in accordance with one embodiment of the invention.
Figure 15:
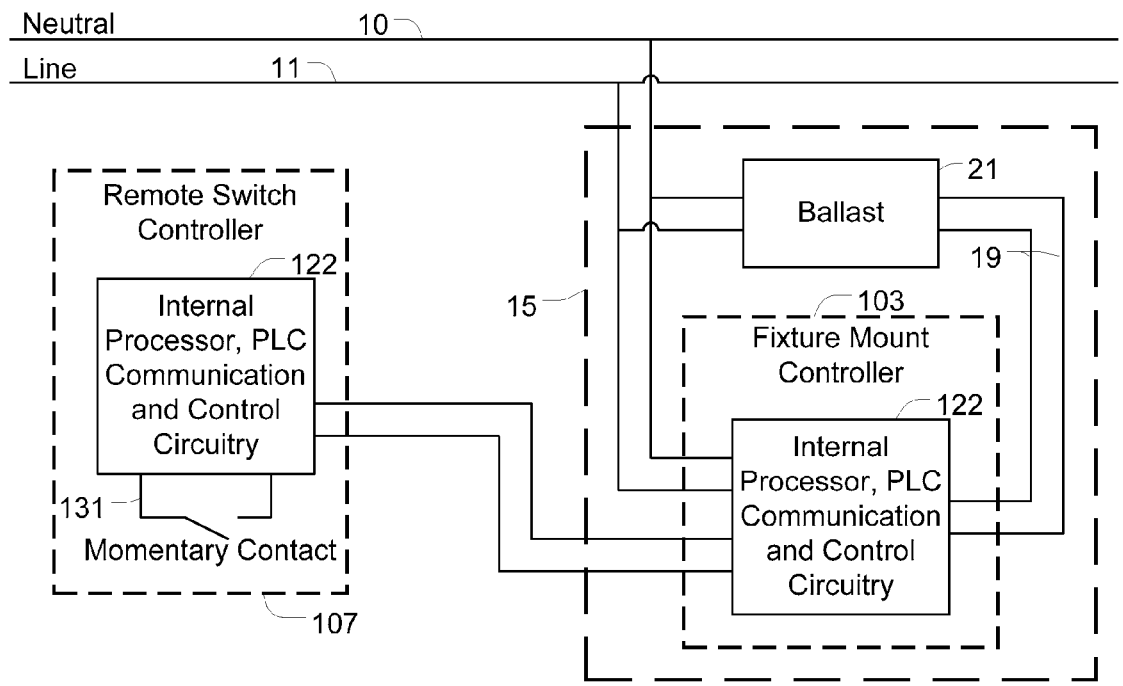
FIG. 15 is an exemplary block diagram illustrating installation and wiring for a remote switch controller and a fixture mount controller comprising dimming apparatus, in accordance with one embodiment of the invention.
Figure 17:
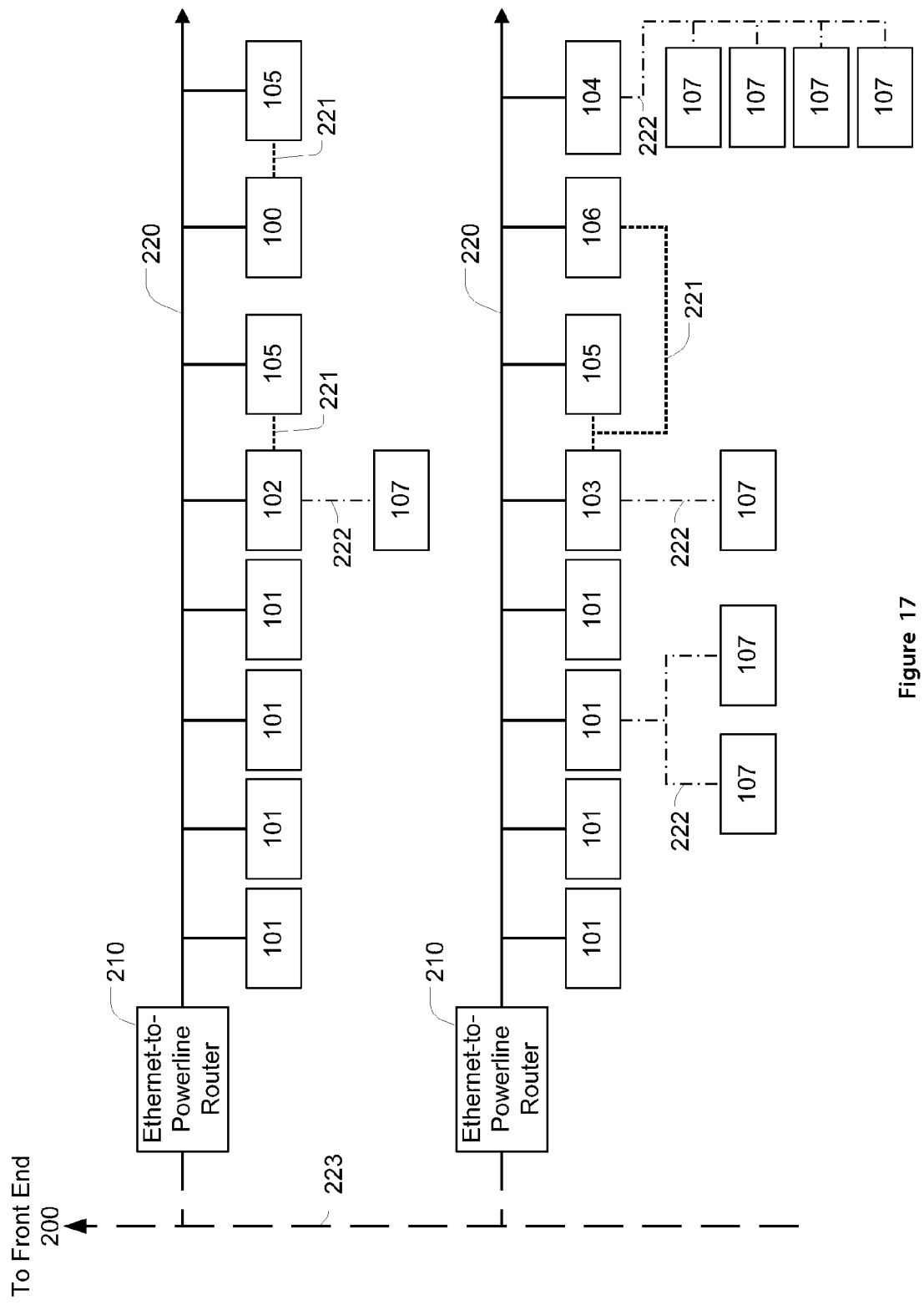
FIG. 17 is an exemplary block diagram illustrating a system architecture, in accordance with one embodiment of the invention.

In another embodiment of the invention, a remote switch controller is provided as a low cost, remote switching device that may provide fixture actuation in wiring configurations where the power feed is not located in the switch gang. The remote switch controller may have a similar housing as the lighting controller, but would not comprise a sensory element (e.g. a light sensor). The remote switch controller may also comprise a momentary contract switch as a switching means. A manual pushbutton and a tri-color LED may be included. The LED color may be determined by jumpers on board the switch, rather than through software configuration. The remote switch controller 107 can sit under controller 100, as shown in FIG. 12 and FIG. 13 (or controller 101, as shown in FIG. 17), or a fixture mount controller 102, described below in further detail, as shown in FIG. 14 and FIG. 15. The remote switch controller 107 may be installed in the same manner as a normal light switch in a 2-wire configuration as shown in FIG. 12, or in a 3-wire configuration as shown in FIG. 13. Accordingly, the remote switch controller 107 provides a solution for any number of different multi-way switching scenarios when one or more remote switch controller 107 is paired with any of the above-noted devices, and also a single point of interaction with the lighting system for an occupant. Advantageously, there is no practical limit on the number of remote switch controllers 107 that may be employed. Further, the exemplary configuration shown in FIG. 12 may omit use of a third wire present between conventional multi-way switches (referred to as the 'traveler'), thereby reducing complexity of installation.

Figure 6:
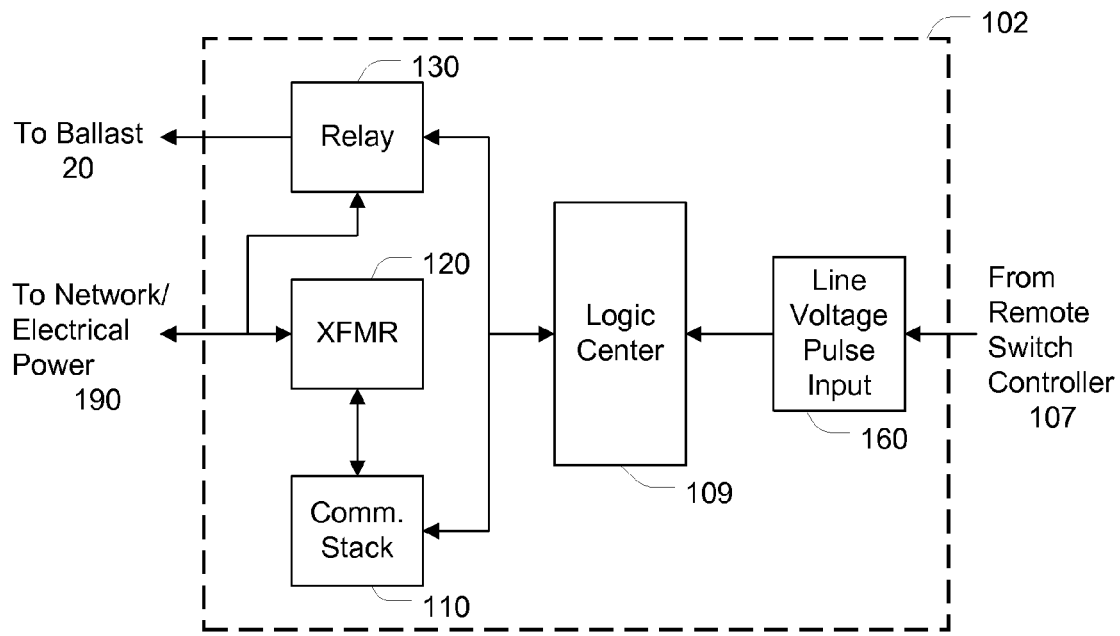
FIG. 6 is an exemplary block diagram illustrating a fixture mount controller, in accordance with one embodiment of the invention.

In another embodiment of the invention, a fixture mount controller 102 is provided, which addresses two functional configurations. Referring to FIG. 6, the fixture mount controller 102 interfaces with the remote switch controller 107 in On/Off scenarios, when power is run to the fixture 180 instead of to the switch. Signals sent from the remote switch controller 107 feed directly into the 120 V universal input on board the fixture mount controller 102, then triggering a response in the on-board latching relay 130 to control power to the ballast 20.

Figure 7:
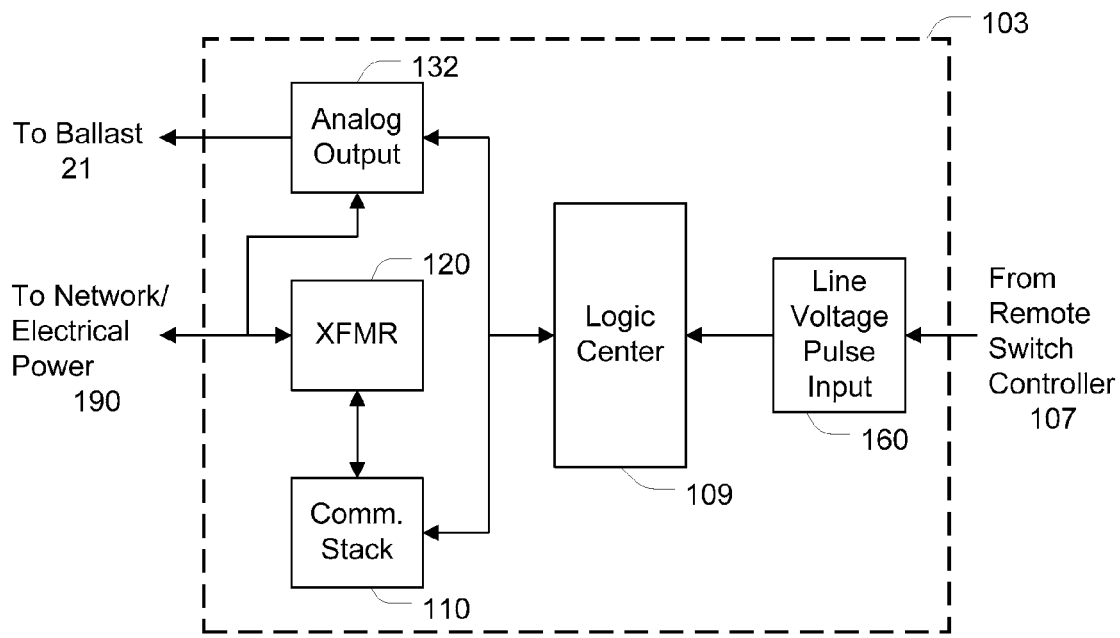
FIG. 7 is an exemplary block diagram illustrating a fixture mount controller, in accordance with one embodiment of the invention.

Referring to FIG. 7, in dimming scenarios, fixture mount controller 103 is provided with analog output 132 in fixture mount controller 102, and couples with the remote switch controller 107 through the same 120 V universal input. The analog output 132 from the fixture mount controller 103 wires directly into a 0-10 V or a 4-20 mA input on any standard dimmable ballast 21.

In either scenario, the fixture mount controller (102 or 103) may be installed into any fluorescent fixture ballast raceway.

Preferably, the fixture mount controllers 102, 103 include the same powerline communication and web server capability of controllers 100 or 101. Whether in On/Off or dimming applications, the fixture mount controllers 102, 103 may send status updates or usage history back to a central web server. The fixture mount controller also responds to change of state overrides, either On/Off or ambient light level set point, from the front end. Similar to the lighting controller 100, no network communication is necessary for manual operation of the fixture mount controller 102, 103 at the space, when in combination with the use of one or more remote switch controllers 107 and/or lighting controllers 100, 101.

The fixture mount controller addresses several circuit configurations, including power to fixture; central contactor panels; addressable Sub-Zoning; and dual circuit switching. The fixture mount controller may be constructed to operate in any voltage environments, such as in a range from 110 V to 277 V or 220 V to 347 V. The fixture mount controller may distinguish between On/Off commands and dimming control through pulse width modulation. Further, the fixture mount controller may provide multiple circuit switching, such as triple- or quadruple-circuit switching.

The fixture mount controller may be provided for mounting in a raceway, also known as the ballast compartment, of a florescent tube fixture. Installation of the fixture mount controller differs from the lighting controller in terms of mounting the device. The fixture mount controller may be provided with mounting tabs for simple attachment to a standard raceway. The electrical connections are similar to those provided in the lighting controller, as shown in FIG. 14. In the raceway of the fixture section 15, the wiring configuration accounts for a single device, the ballast 20 itself. Introducing a second device to the circuit necessitates a wiring splice, but would not compromise the system integrity. Installation of the fixture mount controller 102 requires a minimum amount of time to complete (approximately 12 minutes for a qualified electrician). The wiring configuration is shown in FIG. 15 for dimming installation, i.e., with the fixture mount controller 103 connecting to ballast 21, through control of a ballast dimming signal 19.

Due to its intended mounting location, the fixture mount controller requires periphery components to function in a given space to interpret commands from occupants. The fixture mount controller may interface with the remote switch controller, as well as an occupancy sensor and a lux sensor, described in further detail below, to gather information from the space, as exemplified by the logic interaction shown in FIG. 16, described in further detail below. The fixture mount controller may also act as a network-enabled switching mechanism that energizes the relay(s) in it after receiving a network command to do so. The relay can be used to switch a variety of different devices including but not limited to, ballasts, motors, pumps, heaters, chillers and fans. It is understood that in the figures, references to fixture 180 or ballast 20, 21 can also refer to other switchable devices, such as motors, pumps, heaters, chillers and fans.

In another embodiment, the lighting controller or fixture mount controller may further comprise digital input(s) for external motion and light detectors, and 24 V DC output for powering the external motion and light detection.

Figure 9:
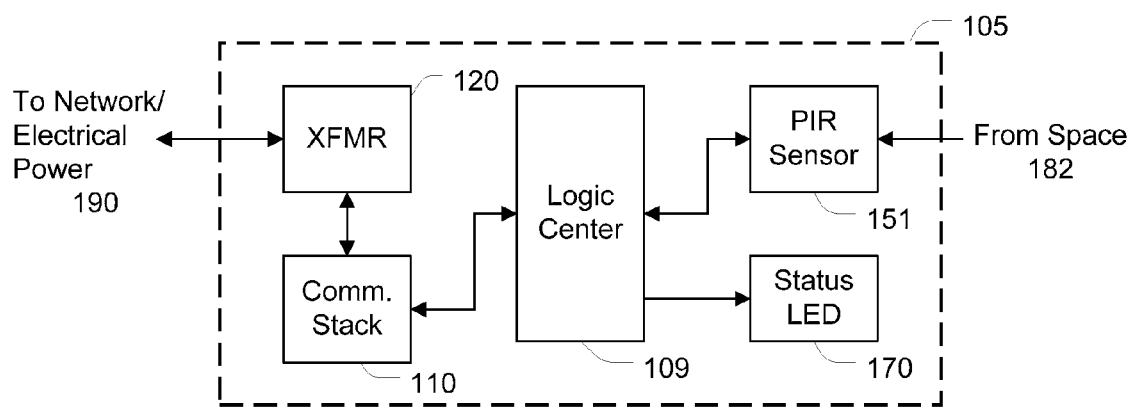
FIG. 9 is an exemplary block diagram illustrating an occupancy sensor, in accordance with one embodiment of the invention.

Referring to FIG. 9, in one embodiment of the invention, a remote PIR occupancy sensor apparatus 105 is provided for use where the architecture or purpose of the space does not allow for an occupancy sensor/switch combination (hereinafter referred to as an "occupancy sensor"). The occupancy sensor 105 may communicate to any apparatus on the network, preferably via a master/slave logical relationship back to at least one of the lighting controllers and/or fixture mount controllers. The sensor may be a wall- or a ceiling-mount device that requires only a power and a neutral to function and communicate. Other sensors may require power and neutral wires for power and two twisted pair low voltage wires for signal communication back to the lighting controller and/or fixture mount controller.

Figure 10:
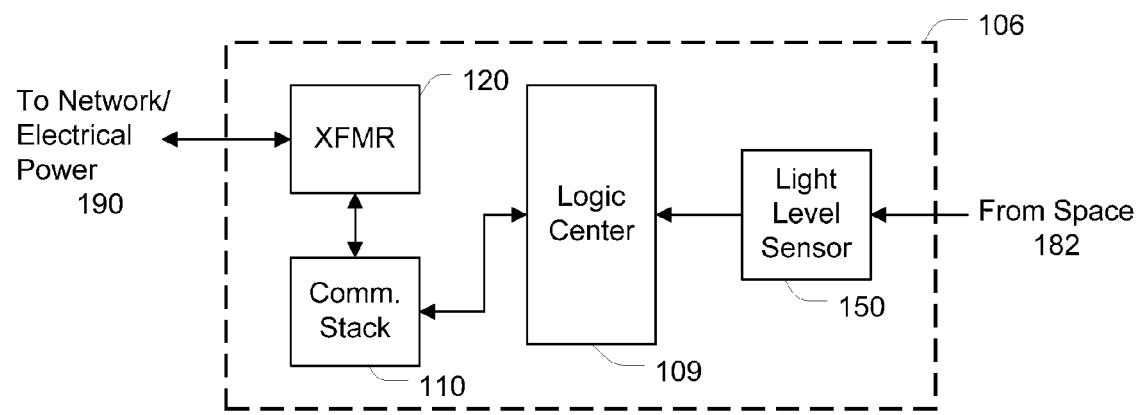
FIG. 10 is an exemplary block diagram illustrating a light sensor, in accordance with one embodiment of the invention.

Referring to FIG. 10, in another embodiment of the invention, a remote light sensor apparatus 106 is provided for use in a daylight harvesting system (hereinafter referred to as a "lux sensor"). The lux sensor 106 measures the amount of existing light in a space, and then, using its BPL communication stack 110, may communicate that information to any apparatus on a network, preferably to at least one fixture mount controller. The fixture mount controller may supplement existing ambient light by slowly raising the light level in the room until a desired foot-candle set point is reached. The lux sensor 106 uses a similar ceiling- or wall-mount housing and similar wiring as the occupancy sensor 105.

Both the occupancy sensor 105 and lux sensor 106 are ceiling- and/or wall-mount devices that may be patched into the power line in a similar manner to the other apparatus of the present invention. They also may be non-communicating devices that require power and signal communication wires (4) to interface them with lighting controllers and/or fixture mount controllers.

Figure 16:
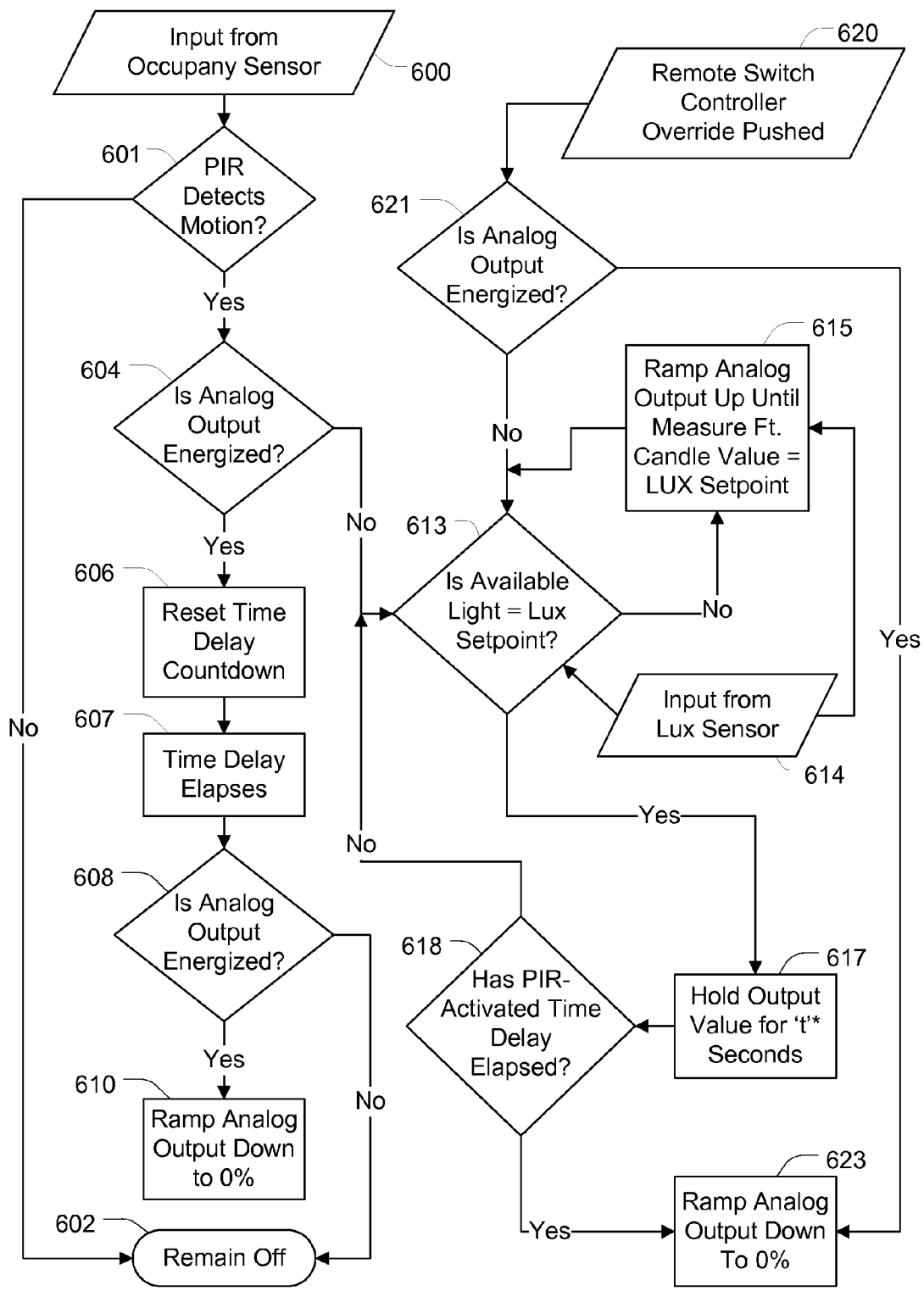
FIG. 16 is an exemplary block diagram illustrating the logical process and sequence of operations for a fixture mount controller in dimming scenarios, in accordance with one embodiment of the invention.

Referring to FIG. 16, the logic for controlling a dimmable ballast 21 with the fixture mount controller 103 in "AutoON" mode is shown, with both sensory control and manual override, either of which will trigger lighting of the fixture. With the input from a connected occupancy sensor 105 (Input 600), the PIR constantly monitors for motion. The logical connection of the occupancy sensor 105 to the fixture mount controller 103 is shown symbolically by the dashed line 221 in the network architecture shown in FIG. 17. If no motion is detected at Step 601, the analog output will remain off (Step 602). When motion is detected at Step 601, the analog output is first checked for whether it is energized (Step 604), and if so, a time delay countdown is reset (Step 606). Upon the time delay elapsing (Step 607), the analog output is checked for whether it is energized (Step 608), and if so, the analog output is ramped down to zero (Step 610). If the analog output is not energized at Step 608, it remains off (Step 602).

When motion is detected at Step 601 and the analog output is not energized at Step 604, input from the lux sensor (Input 614) is used to check for whether available light in the space is above a user-defined lux setpoint (Step 613), and if so, the analog output value will be held for a set time duration of 't' seconds (Step 617), after which the PIR-activated time delay is checked for whether it has elapsed (Step 618). The time duration of Step 617 of 't' seconds preferably corresponds to the lux sensor input scan rate. If the PIR-activated time delay has not elapsed at Step 618 the sequence returns to Step 613 to recheck available light in the space. If the PIR-activated time delay has elapsed at Step 618, the analog output is ramped down to zero (Step 623).

At any time the remote switch controller override is activated (Input 620), the analog output is checked for whether it is energized (Step 621). If not energized, the sequence returns to Step 613 to check available light in the space. If already energized, the analog output is ramped down to zero (Step 623).

As readily appreciated by a person skilled in the art, by ramping up ballast output, only the light level necessary is provided in the space, according to the lux setpoint.

The communication stack hardware is similar to that described for the lighting controller 100 or 101, and would vary in the network variables contained in its firmware.

The fixture mount controller may mirror the functionality of the lighting controller, so the functional aspects of the system remain the same despite any variation in physical installation and wiring in a building.

Figure 8:
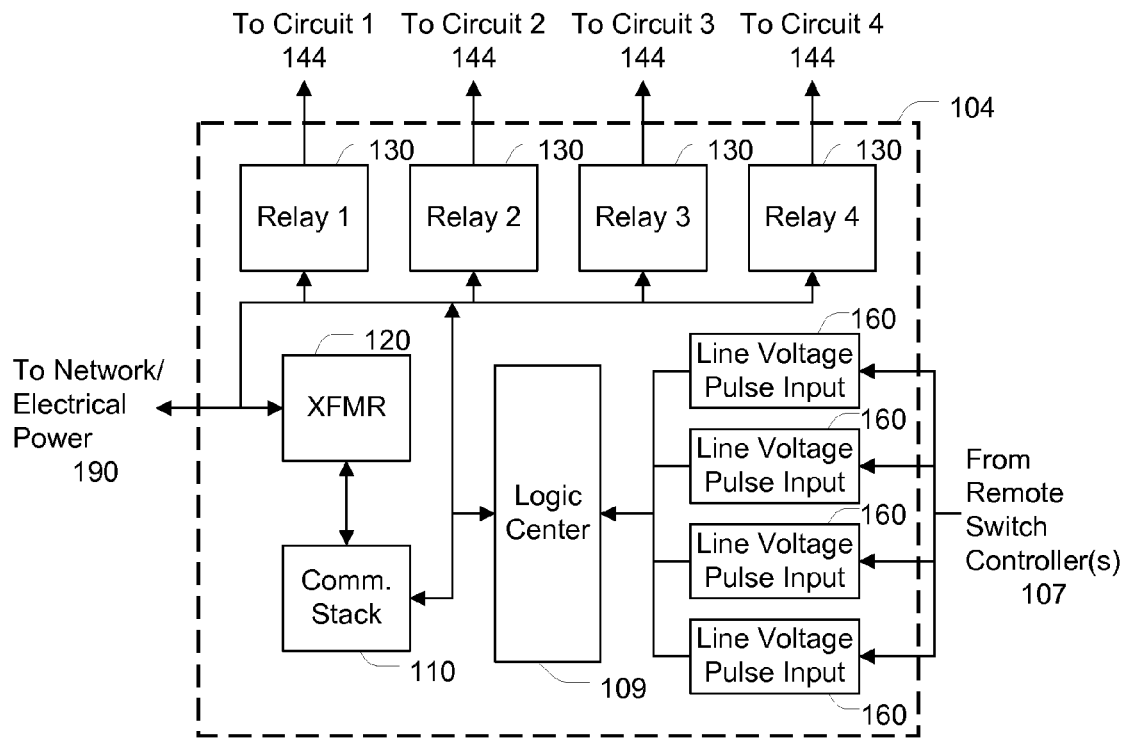
FIG. 8 is an exemplary block diagram illustrating a fixture mount controller, in accordance with one embodiment of the invention.

Referring to FIG. 8, in another embodiment of the present invention, the fixture mount controller may additionally comprise multiple relays 130 to provide control from a centralized contactor panel. As shown in this particular example, a user may apply four outputs 144 to fixture mount controller 104 in alternative scenarios and a reduced cost per circuit. One or more line voltage pulse inputs 160 may be provided to interface from one or more remote switch controllers 107, allowing control of multiple circuits from one or more locations.

Daylight Harvesting systems (DH) combine sensory and modulating control to provide an end-user with sufficient light at all times, while saving energy in the process. DH systems consist of a light level (or lux) sensor, a modulating controller, and a manual override switch. The goal of the DH system is to satisfy a user defined set point of foot-candles that should be provided in a given occupied space. The lux sensor gathers information from the space about the amount of ambient light available. Based on that information, the controller modulates the artificial light sources such that the ambient light is supplemented and the set point is satisfied. If the ambient light available is greater than the set point, the controller completely de-energizes the fixtures. For such DH systems, the fixture mount controller 103, for example, may perform as the modulating controller, adjusting the ballast up or down to meet the needs of the space.

The present invention comprises additional stand alone, remote sensing apparatus to provide additional functionality and convenience. For example, the location of a light switch may be behind a door, or on a wall that does not face the occupied portion of the space it controls. Accordingly, separate, remote sensors are desirable to supplement the installation of a lighting controller in an unsuitable location. The remote sensor apparatuses of the present invention may be conveniently installed remotely from the light switch location, as they comprise the same BPL communication stack described above, including remote override commands to tune sensitivity.

In one embodiment, the present invention employs standard XML as defined by the oBIX (OASIS Open Building Information eXchange Technical Committee) standard for all communications, which is hereby incorporated by reference. This provides a flexible, IP-based functionality suitable for OEM markets and low-cost deployment.

An example system architecture comprising various switches, controllers and sensors of the present invention is shown in FIG. 17. Network traffic may be segmented via powerline (220) to Ethernet routers 210, and to an Ethernet network 223, each of which can support a sub-network of BPL communicating devices. Logical binding 221 between devices on the same network allows for stand-alone sensors (e.g., occupancy sensor 105, lux sensor 106) to communicate directly with their corresponding controllers (e.g., fixture mount controllers 102, 103, 104).

In one embodiment, the present invention provides for communication capabilities via a Broadband Over Powerline (BPL) network. BPL networks differ significantly from previously attempted power line network lighting solutions, as they can establish a network robust enough to cope with random inductive interferences found in most commercial and industrial power line environments. Commercial and industrial spaces support heavier equipment than found in a residential setting. Chillers, pumps, variable frequency drives and other industrial and manufacturing equipment all contribute to high levels of inductive noise in the power line infrastructure.

The present invention may include a BPL module in each device. The module is standardized, and only varies in mechanical features unique to each embodiment. While the BPL communications module may remain constant, the performance of each embodiment may be defined by supplemental hardware and firmware. Each device connected to a BPL network will rely on a firmware program local to its processor. This firmware will provide a sequence of operations as well as a vocabulary of data points, called network variables, which the network will use to issue commands and monitor status. The BPL module may include a unique hardware address such as, for example, a Media Access Control (MAC) address. The network allows users to download new firmware versions to devices while they are installed and operational in a system. Example versions of this firmware are available supporting industry standard protocols, such as XML/SOAP, BACNetIP, BACNet MSTP, Modbus, LON, TCP/IP, SNMP and OBiX. The advantage of allowing a flexible protocol is that the majority of front ends found in the industry may be supported.

The BPL module may include additional ports for additional features, such as wireless device integration to allow a bridge between wireless and power line communication.

The invention claimed is:

1. An addressable controller for installation in a building comprising an electrical power distribution wiring, a room, a device box in the room, a light fixture comprising a lighting element positioned for illuminating the room and at least one addressable space sensing sensor remote from said addressable controller and comprising a sensor communications stack and a sensor powerline modem for transmitting sensed data using the electrical distribution wiring, the controller comprising:
   a housing dimensioned to fit in the device box;
   a microprocessor powerable by the electrical distribution wiring;
   a controller communications stack;
   a controller powerline modem,
   a memory;
   microprocessor-executable instructions stored in said memory; and
   a relay for controlling delivery of electricity to the light fixture;
   wherein the sensed data is received from the at least one addressable space sensing sensor via said controller communications stack, said controller powerline modem and the electrical distribution wiring, said microprocessor energizing and de-energizing said relay in accordance with the sensed data and said computer-executable instructions in order to one of illuminate and extinguish the lighting element.

2. The addressable controller of claim 1, wherein the sensor communications stack comprises a TCP/IP communications stack and said controller communications stack comprises a TCP/IP communications stack.

3. The addressable controller of claim 1, further comprising a standard decora-style faceplate mounted to said device box.

4. The addressable controller of claim 1, wherein said controller further comprises a web server wherein when accessed, said web server displays a web page comprising data that regulate a functioning of said controller and wherein said data can be changed by a user.

5. The addressable controller claim 1, wherein the light fixture further comprises a dimmable ballast and said microcontroller adjusts said dimmable ballast such that light emitted by said lighting element is adjusted and the room light level matches a light level setpoint.

6. The addressable controller of claim 1, wherein the room comprises at least one external window, wherein the at least one addressable space sensing sensor comprises a light level sensor, the sensed data comprises an ambient light level in the room and said microcontroller energizes said relay such that the lighting element is illuminated when the ambient light level is below a light level setpoint.

7. The addressable controller of claim 1, wherein the room comprises at least one external window, wherein the at least one addressable space sensing sensor is a light level sensor, the sensed data comprises an ambient light level in the room and said microcontroller de-energizes said relay such that the lighting element is extinguished when the ambient light level is above a light level setpoint.

8. The addressable controller of claim 1, wherein said addressable controller comprises a manual override for energizing and de-energizing said relay.

9. The addressable controller of claim 1, wherein the at least one addressable space sensing sensor comprises a motion detector for detecting user presence in the room, wherein the sensed data comprises a user presence in the 32 room and wherein said microcontroller energizes said relay such that said lighting element is illuminated on detection of the user presence.

10. A lighting system for installation in a building comprising an electrical power distribution wiring and a room, the system comprising:
   a light fixture comprising a lighting element positioned for illuminating the room;
   a relay for controlling delivery of electricity to said light fixture;
   at least one addressable controller powerable by the electrical distribution wiring and comprising a communications stack and a powerline modem, said controller further comprising a microprocessor, a memory, computer-executable instructions stored in said memory, and a manual override switch;
   at least one addressable space sensing sensor remote from said addressable controller and comprising a communications stack and a powerline modem wherein sensed data is transmitted between said at least one space sensing sensor and said controller via their respective communications stacks, powerline modems and the electrical distribution wiring; and
   an Ethernet-to-powerline router for providing communications between said controller and a front end webserver, said communications comprising at least a status from said controller to said front end web server on change of status and an override command from said front end web server to said controller;

wherein said microprocessor energizes and de-energizes said relay in accordance with said manual override switch, said override command, said sensed data and said computer-executable instructions in order to one of illuminate and extinguish said lighting element.

11. The lighting system of claim 10, wherein said communications comprises usage data.

12. The lighting system of claim 10, wherein each of said communications stacks comprises a TCP/IP communications stack.

13. The lighting system of claim 12, wherein said light fixture further comprises a dimmable ballast and said microcontroller adjusts said dimmable ballast such that light emitted by said lighting element is adjusted and the room light level matches a light level setpoint.

14. The lighting system of claim 10, wherein the room comprises at least one external window, said at least one addressable space sensing sensor comprises a light level sensor transmitting an ambient light level in the room to said microcontroller, and wherein said microcontroller energizes said relay such that said lighting element is illuminated and when said ambient light level is below a light level setpoint.

15. The lighting system of claim 10, wherein the room comprises at least one external window, wherein said at least one addressable space sensing sensor comprises a light level sensor transmitting an ambient light level in the room to said microcontroller, and wherein said microcontroller energizes said relay such that said lighting element is extinguished and when said ambient light level is above a light level setpoint.

16. The lighting system of claim 10, wherein said at least one addressable space sensing sensor comprises a motion detector for detecting user presence in the room, said motion detector transmitting a detected user presence to said microcontroller and wherein said microcontroller energizes said relay such that said lighting element is illuminated on detection of the user presence.

17. The lighting system of claim 16, wherein said microcontroller de-energizes said relay such that said lighting element is extinguished on expiry of a time delay following the user presence no longer being detected in the room.

18. The lighting system of claim 16, wherein said motion detector comprises a Passive Infrared (PIR) sensor for sensing user presence in the room.

19. The lighting system of claim 14, wherein said light level sensor comprises a user accessible potentiometer and further wherein said setpoint can be adjusted using said potentiometer.

20. The lighting system of claim 14, wherein said light level sensor comprises a communications stack for communicating with said microcontroller.

21. The lighting system of claim 10, wherein said controller further comprises a web server wherein when accessed, said web server displays a web page comprising data that regulate a functioning of said controller and wherein said data can be changed by a user.

* * * * *